(12) United States Patent
Choi et al.

(10) Patent No.: US 9,634,312 B2
(45) Date of Patent: Apr. 25, 2017

(54) ELECTRODE TERMINAL AND BATTERY MODULE HAVING THE SAME

(71) Applicant: Samsung SDI Co., Ltd., Yongin-si, Gyeonggi-do (KR)

(72) Inventors: Hong-Keun Choi, Yongin-si (KR); Min-Cheol Bae, Yongin-si (KR); Ik-Jae Jeong, Yongin-si (KR); Kyoung-Hwan Noh, Yongin-si (KR); Ji-Ho Lee, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/677,779

(22) Filed: Apr. 2, 2015

(65) Prior Publication Data
US 2015/0287974 A1 Oct. 8, 2015

(30) Foreign Application Priority Data

Apr. 7, 2014 (KR) .................. 10-2014-0041054

(51) Int. Cl.
*H01M 2/22* (2006.01)
*H01M 2/20* (2006.01)
*H01M 2/30* (2006.01)

(52) U.S. Cl.
CPC ............ *H01M 2/305* (2013.01); *H01M 2/206* (2013.01)

(58) Field of Classification Search
CPC ........ H01M 2/305; H01M 2/206; H01M 2/30; H01M 2/302
See application file for complete search history.

(56) References Cited

U.S. PATENT DOCUMENTS

| 2012/0177978 | A1* | 7/2012 | Kim ........................ H01M 2/30 429/159 |
| 2012/0183845 | A1* | 7/2012 | Kawamoto ........... H01M 2/305 429/179 |
| 2012/0214053 | A1 | 8/2012 | Kim |
| 2012/0264008 | A1* | 10/2012 | Okamoto ............ H01M 2/0404 429/182 |

FOREIGN PATENT DOCUMENTS

| KR | 10-2011-0029869 (A) | 3/2011 |
| KR | 10-2012-008154 (A) | 7/2012 |
| KR | 10-2012-0095260 (A) | 8/2012 |

* cited by examiner

*Primary Examiner* — Cynthia K Walls
(74) *Attorney, Agent, or Firm* — Knobbe, Martens, Olson & Bear, LLP

(57) ABSTRACT

An electrode terminal and battery module having the same are disclosed. In one aspect, the electrode terminal includes a first sub-terminal including a plurality of guide grooves and a second sub-terminal including a plurality of guides configured to be respectively inserted into the guide grooves in a sliding manner. At least one of the guide grooves is formed in an upper surface of the first sub-terminal.

20 Claims, 4 Drawing Sheets

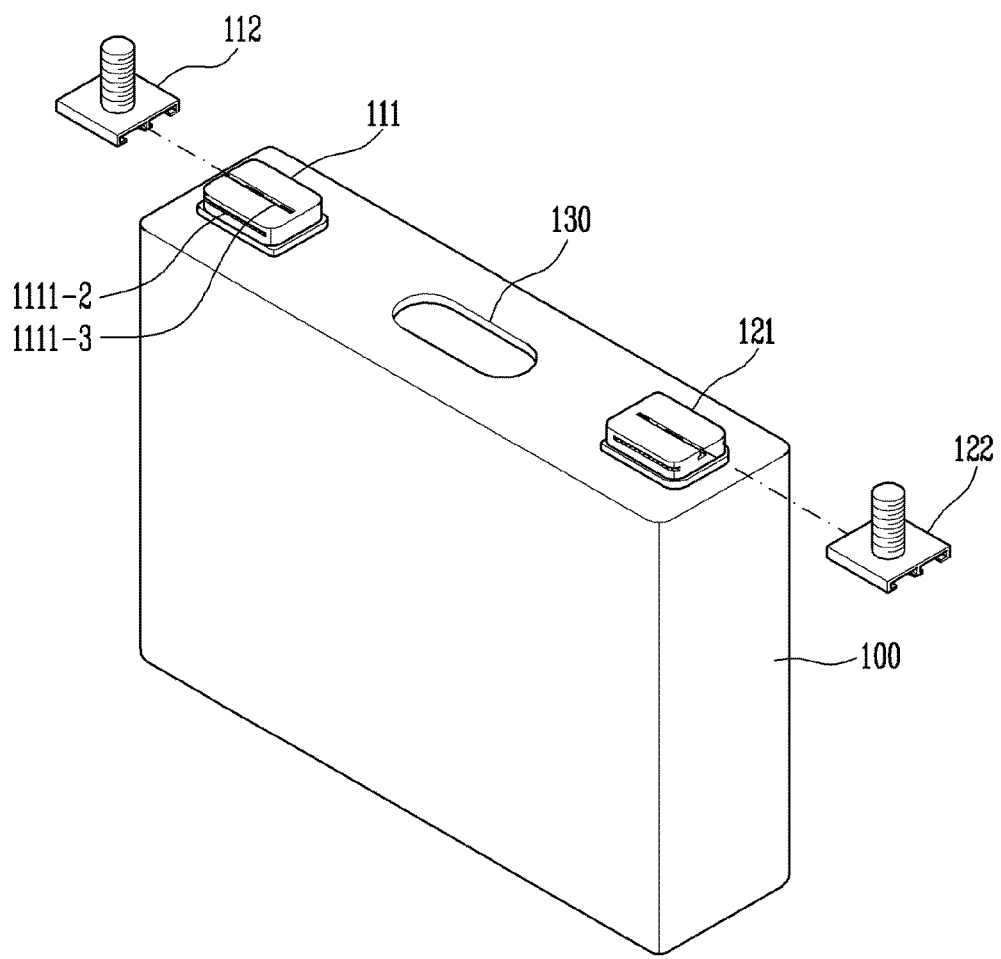

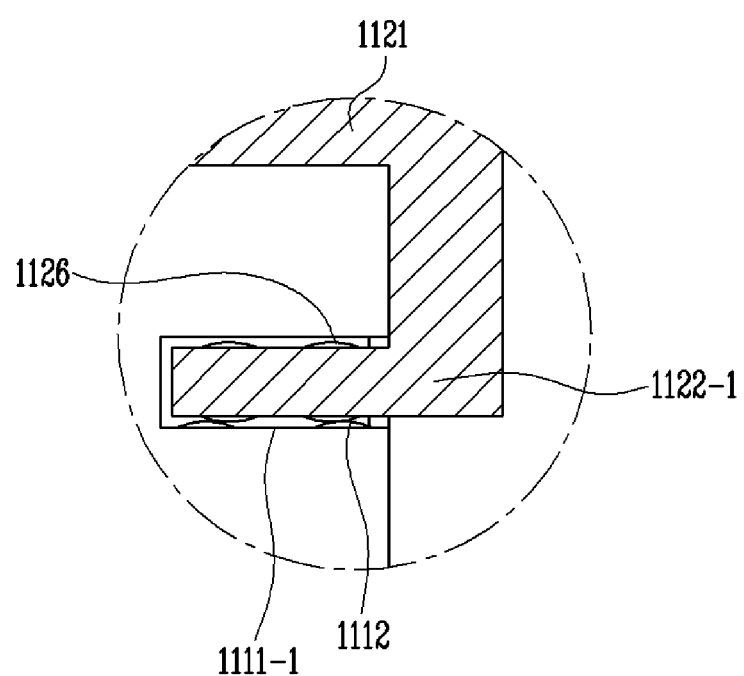

ELECTRODE TERMINAL AND BATTERY MODULE HAVING THE SAME

INCORPORATION BY REFERENCE TO ANY PRIORITY APPLICATIONS

This application claims priority to and the benefit of Korean Patent Application No. 10-2014-0041054, filed on Apr. 7, 2014, in the Korean Intellectual Property Office, the entire contents of which are incorporated herein by reference in their entirety.

BACKGROUND

Field

The described technology generally relates to an electrode terminal and a battery module having the electrode terminal.

Description of the Related Technology

High-output battery modules having high-energy density using a non-aqueous electrolyte are being actively developed. These battery modules attain a high capacity by connecting a number of battery cells in series and can be used for the application of driving the motor of a device with high power requirements, for example, an electric vehicle.

Each of the battery cells includes a positive pole and a negative pole. The battery cells are connected in series to each other via additional connecting members. For example, the positive pole of one of a pair of adjacent battery cells is connected to the negative pole of the other battery cell via a bus bar. An electrode terminal is formed on each of the positive and negative poles of each battery cell to be electrically connected to the connecting member.

SUMMARY OF CERTAIN INVENTIVE ASPECTS

One inventive aspect is an electrode terminal and a battery module including the electrode terminal that can increase a fastening force and reduce both a manufacturing cost and a manufacturing time.

Another aspect is an electrode terminal formed on a battery cell, the electrode terminal including a first sub-terminal including a plurality of guide grooves, and a second sub-terminal including a plurality of guides that are fastened to the guide grooves in a sliding manner, wherein at least one of the guide grooves is formed in an upper surface of the first sub-terminal.

The guide grooves may include a first guide groove formed in a first side surface of the first sub-terminal, a second guide groove formed in a second side surface of the first sub-terminal, and a third guide groove formed in the upper surface of the first sub-terminal.

The second sub-terminal may include a plate-shaped body, a first guide extending downwards vertically from a first end of the body, with an end of the first guide being fastened to the first guide groove in the sliding manner, a second guide extending downwards vertically from a second end of the body, with an end of the second guide being fastened to the second guide groove in the sliding manner, a third guide extending downwards vertically from a central portion of the body, and fastened to the third guide groove in the sliding manner, and a protrusion extending upwards vertically from the body.

The third guide may include a vertical member provided on the central portion of the body in such a way as to extend downwards vertically therefrom, and a horizontal member provided on an end of the vertical member.

The horizontal member may be wider than the vertical member.

A shape of the third guide groove may correspond to a shape of the third guide.

A thread may be formed on the protrusion.

The guide grooves may be formed in a widthwise direction of the battery cell.

A plurality of first locking projections may be formed on at least one surface of the plurality of guide grooves.

A plurality of second locking projections may be formed on at least one surface of the plurality of guides.

Another aspect is a battery module including battery cells connected to each other via a bus bar, wherein each of the battery cells includes electrode terminals to which the bus bar is connected, each of the electrode terminals includes a first sub-terminal including a plurality of guide grooves, and a second sub-terminal including a plurality of guides that are fastened to the guide grooves in a sliding manner, wherein at least one of the guide grooves is formed in an upper surface of the first sub-terminal.

Another aspect is an electrode terminal formed on a battery cell, the electrode terminal comprising a first sub-terminal including a plurality of guide grooves; and a second sub-terminal including a plurality of guides configured to respectively engage with the guide grooves in a sliding manner, wherein at least one of the guide grooves is formed in an upper surface of the first sub-terminal.

The guide grooves can comprise a first guide groove formed in a first side surface of the first sub-terminal; a second guide groove formed in a second side surface of the first sub-terminal, wherein the second side surface opposes the first side surface; and a third guide groove formed in the upper surface of the first sub-terminal. The second sub-terminal can comprise a plate-shaped body; a first guide extending vertically downwards from a first end of the body, wherein an end of the first guide is configured to be fastened to the first guide groove; a second guide extending vertically downwards from a second end of the body, wherein an end of the second guide is configured to be fastened to the second guide groove and wherein the second end of the body opposes the first end; a third guide extending vertically downwards from a central portion of the body, wherein the third guide is configured to be fastened to the third guide groove; and a protrusion extending vertically upwards from the body. The third guide can comprise a vertical member extending vertically downwards from the central portion of the body; and a horizontal member formed on an end of the vertical member.

The horizontal member can have a greater width than the vertical member. The shape of the third guide groove can correspond to the shape of the third guide. The protrusion can be threaded. The lengths of the guide grooves can extend along the width of the battery cell. Each of the guide grooves can comprise a plurality of first locking projections formed on at least one surface thereof. Each of the guides can comprise a plurality of second locking projections formed on at least one surface thereof. The first and second locking projections can be configured to be interlocking.

Another aspect is battery module comprising a plurality of battery cells connected to each other via a plurality of bus bars, wherein each of the battery cells comprises a pair of electrode terminals respectively connected to one of the bus bars and wherein each of the electrode terminals comprises a first sub-terminal including a plurality of guide grooves; and a second sub-terminal including a plurality of guides configured to respectively engage with the guide grooves in a sliding manner, wherein at least one of the guide grooves is formed in an upper surface of the first sub-terminal.

At least one of the guides of each of the electrode terminals can be formed extending from a lower surface of the second sub-terminal and can be configured to be inserted into the guide groove formed in the upper surface of the first sub-terminal. The guide grooves of each of the electrode terminals can comprise first and second guide grooves formed in opposing sides of the first sub-terminal; and a third guide groove formed in the upper surface of the first sub-terminal. The guides of each of the electrode terminals can comprise first and second guides extending from opposing sides of the second sub-terminal and respectively configured to be fastened to the first and second guide grooves; and a third guide extending from the second sub-terminal and interposed between the first and second guides, wherein the third guide is configured to be fastened to the third guide groove.

The cross-section of each of the third guides can have an inverted "T" shape and the cross-section of each of the third guide grooves can have a shape corresponding to the shape of each of the third guides. Each of the first sub-terminals can include first and second sides opposing each other, wherein the second sides of the first sub-terminals of the same battery cell face each other, and wherein each of the guide grooves extends from the first sides towards the second sides of the first sub-terminals. The second sub-terminals can be configured to engageably slide onto the first sub-terminals from the first sides of the first sub-terminals. Each of the guide grooves can comprise a plurality of first locking projections formed on at least one surface thereof. Each of the guides can comprise a plurality of second locking projections formed on at least one surface thereof.

As is apparent from the above description, at least one embodiment is advantageous in that the first sub-terminal and the second sub-terminal are fastened to each other in the sliding manner, thus increasing a fastening force without an additional welding process and reducing both a manufacturing cost and a manufacturing time.

BRIEF DESCRIPTION OF THE DRAWINGS

FIGS. 3A and 3B are detailed perspective views illustrating one of the battery cells shown in FIG. 1.

FIG. 5 is a detailed sectional view illustrating a fastening area B of a first sub-terminal and a second sub-terminal shown in FIG. 4.

DETAILED DESCRIPTION OF CERTAIN INVENTIVE EMBODIMENTS

Figure 1:
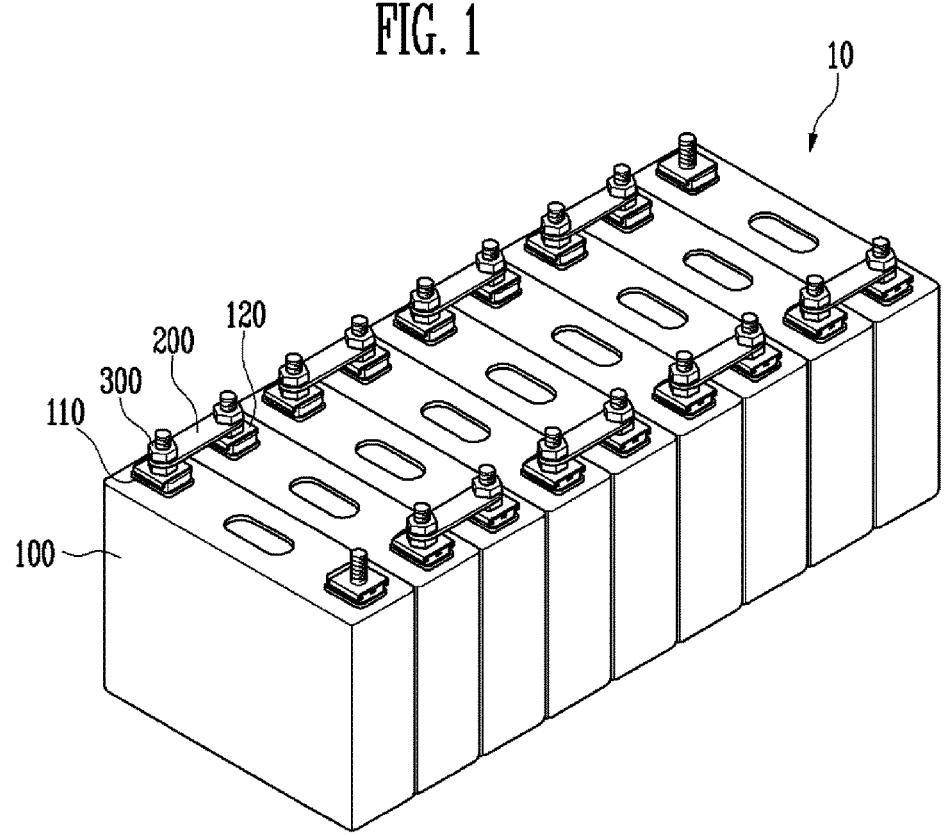
FIG. 1 is a perspective view illustrating a battery module according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the figures, dimensions may be exaggerated for the sake of clarity. It will be understood that when an element is referred to as being "between" two elements, it can be the only element between the two elements, or one or more intervening elements may also be present. Like reference numerals refer to like elements throughout.

The described technology will be described more fully hereinafter with reference to the accompanying drawings, in which example embodiments are shown. Further, like reference numerals are used to identify like elements throughout different drawings. While the described technology has been described using specific terms, such description is for illustrative purposes only, and it is to be understood that changes and variations may be made without departing from the spirit or scope of the following claims. In the following description, when a detailed description of known function or configuration related to the described technology would make the subject matter of the described technology unclear, such detailed description is omitted.

Hereinafter, the embodiments of the described technology will be described in detail with reference to the accompanying drawings.

FIG. 1 is a perspective view illustrating a battery module according to an embodiment.

Referring to FIG. 1, the battery module 10 includes a plurality of battery cells 100, and bus bars 200 electrically connecting the battery cells 100 to each other.

The battery cell 100 is a member for generating electric energy. For example, the battery cell 100 may be one of various kinds of battery cells, such as a primary battery or a secondary battery. Although a secondary, or rechargeable, battery will be described as the battery cell 100 herein for the convenience of description, the described technology is not limited thereto.

The battery cell 100 includes a battery case that is open at a surface thereof and an electrode assembly and an electrolyte that are accommodated in the battery case. The electrode assembly and the electrolyte may electrochemically react with each other, thus generating electric energy. The battery case may be sealed by a cap assembly sealing the open surface of the battery cell 100.

Electrode terminals 110 and 120 having different polarities protrude upwards from a surface of the battery cell 100, thus providing a path for electrically connecting with external components. The battery cell 100 may further include a vent 130 as a safety means, the vent 130 (see FIG. 3A) serving as a passage for discharging gas or heat out of the battery cell 100.

The following description will respectively refer to the electrode terminals 110 and 120 as a positive-pole terminal and a negative-pole terminal.

As shown in FIG. 1, the battery cells 100 are aligned in a predetermined direction and are in contact with each other. Here, the adjacent battery cells 100 are electrically connected to each other via the bus bars 200.

The battery cells 100 can be connected to each other in series or in parallel. For example, as shown in FIG. 1, the battery cells 100 are aligned such that the positive poles and the negative poles alternate with each other.

Hereinafter, the technical spirit of the described technology will be described with reference to the connection of battery cells 100 in series as shown in FIG. 1.

The bus bar 200 may be implemented in the shape of a plate that is formed of a conductive material. For example, the bus bar 200 has a shape corresponding to the shapes of the electrode terminals 110 and 120 so that the bus bar 200 can be stably seated on the electrode terminals 110 and 120.

For example, holes may be formed in the bus bar 200 having a shape corresponding to the shapes of the electrode terminals 110 and 120.

Figure 2:
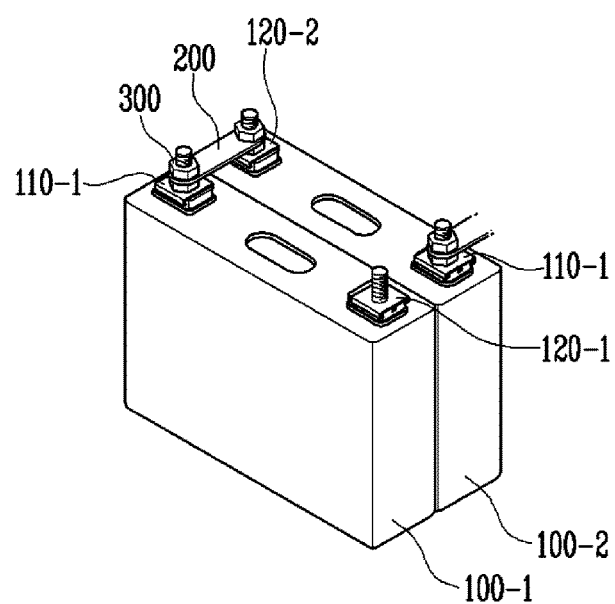
FIG. 2 is a detailed perspective view illustrating two adjacent battery cells among battery cells shown in FIG. 1.

FIG. 2 is a detailed perspective view illustrating two adjacent battery cells among battery cells shown in FIG. 1. In FIG. 2, a first battery cell 100-1 and a second battery cell 100-2 are connected in series.

Referring to FIG. 2, the first and second battery cells 100-1 and 100-2 are aligned in such a way that the positive and negative poles of the first battery cell 100-1 respectively face the negative and positive poles of the second battery cell 100-2.

The positive-pole terminal 110-1 of the first battery cell 100-1 and the negative-pole terminal 120-2 of the second battery cell 100-2 are connected to each other via the bus bar 200. The negative-pole terminal 120-1 of the first battery cell 100-1 and the positive-pole terminal 110-2 of the second battery cell 100-2 are connected to external components. For example, the negative-pole terminal 120-1 of the first battery cell 100-1 and the positive-pole terminal 110-2 of the second battery cell 100-2 may be connected to components external to the battery module 10 or connected to the electrode of another battery cell via another bus bar 200.

Figure 3B:
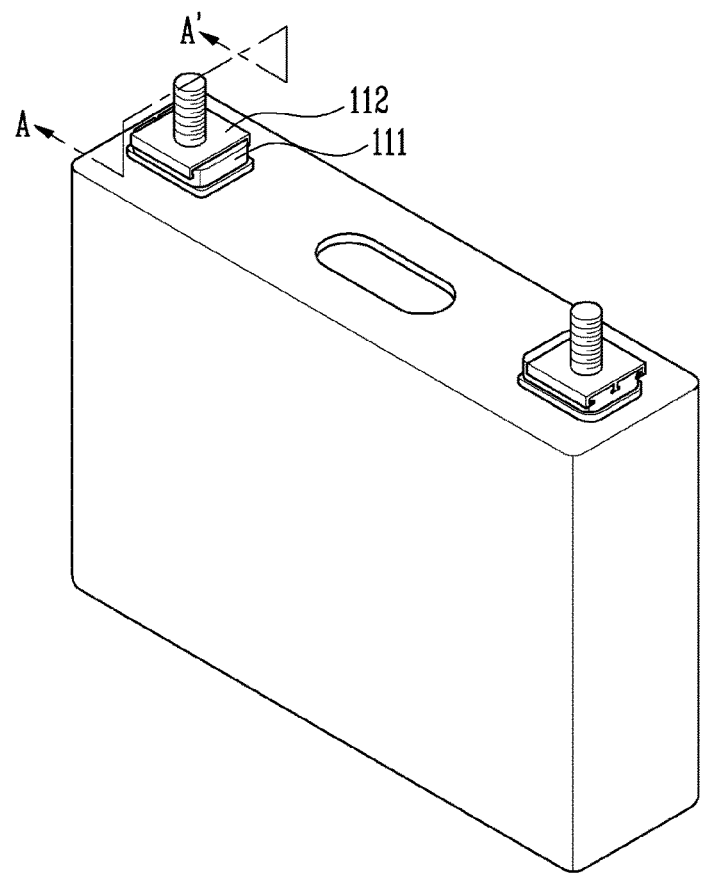
Figure 4:
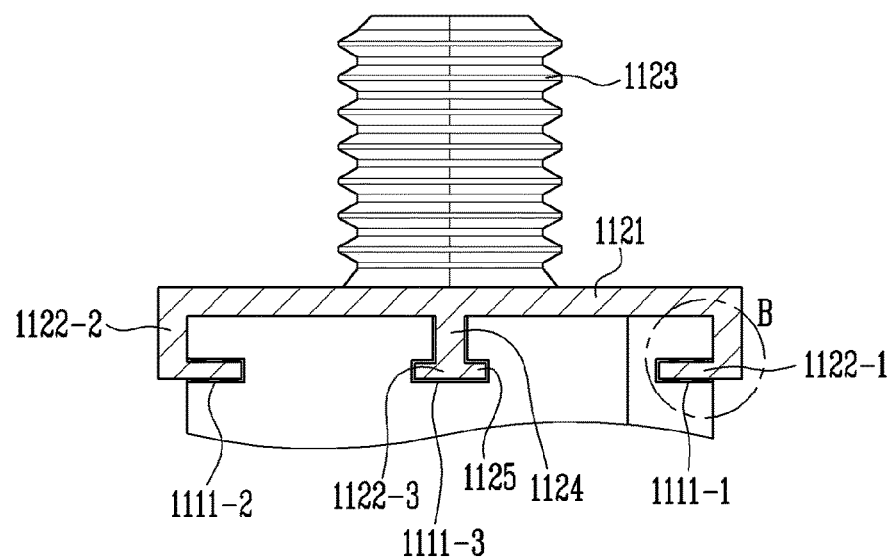
FIG. 4 is a sectional view of an electrode terminal taken along line A-A' of FIG. 3B.

FIGS. 3A and 3B are detailed perspective views illustrating one of the battery cells shown in FIG. 1. FIG. 4 is a sectional view of an electrode terminal taken along line A-A' of FIG. 3B.

FIG. 3A illustrates a configuration in which the first sub-terminal 111 of the positive-pole terminal 110 is not fastened to the second sub-terminal 112 and the first sub-terminal 121 of the negative-pole terminal 120 is not fastened to the second sub-terminal 122. FIG. 3B illustrates a configuration in which the first sub-terminal 111 of the positive-pole terminal 110 is fastened to the second sub-terminal 112 and the first sub-terminal 121 of the negative-pole terminal 120 is fastened to the second sub-terminal 122. The first sub-terminal 111 is fastened to the second sub-terminal 112 in a widthwise direction of the battery cell 100.

Referring to FIGS. 3A, 3B, 4 and 5, the positive-pole terminal 110 and the negative-pole terminal 120 are formed on a surface of the battery cell 100. The positive-pole terminal 110 and the negative-pole terminal 120 are substantially the same except that they have opposing polarities.

The positive-pole terminal 110 includes the first sub-terminal 111 and the second sub-terminal 112 which can be fastened to each other in a sliding manner.

A plurality of guide grooves 1111-1 to 1111-3 are formed in the first sub-terminal 111. Specifically, the first guide groove 1111-1 is formed in one side surface of the first sub-terminal 111. The second guide groove 1111-2 is formed in the other side surface of the first sub-terminal 111. The third guide groove 1111-3 is formed in an upper surface of the first sub-terminal 111.

Further, a plurality of guides 1122-1 to 1122-3 are provided on the second sub-terminal 112 and the guides 1122-1 to 1122-3 have shapes corresponding to those of the guide grooves 1111-1 to 1111-3 formed in the first sub-terminal 111.

That is, the first guide groove 1111-1 and the first guide 1122-1, the second guide groove 1111-2 and the second guide 1122-2, and the third guide groove 1111-3 and the third guide 1122-3 respectively have corresponding shapes.

The first guide groove 1111-1 is formed in one side surface of the first sub-terminal 111 in the widthwise direction of the battery cell 100 forming a recess in the one side surface. The second guide groove 1111-2 is formed in the other side surface of the first sub-terminal 111 in the widthwise direction of the battery cell 100 forming a recess in the other side surface. The third guide groove 1111-3 is formed in the upper surface of the first sub-terminal 111 in the widthwise direction of the battery cell 100 forming a recess in the upper surface.

Particularly, the third guide groove 1111-3 is formed in the upper surface of the first sub-terminal 111 forming a vertical recess. The third guide groove 1111-3 has a laterally widened end. That is, the bottom end of the third guide groove 1111-3 is wider than the midsection thereof.

The second sub-terminal 112 includes a body 1121, the guides 1122-1 to 1122-3 and a protrusion 1123.

The body 1121 has a shape corresponding to that of the upper surface of the first sub-terminal 111. For example, when the upper surface of the first sub-terminal 111 has a plate shape as shown in FIG. 3A, the body 1121 also has a plate shape to correspond to the shape of the upper surface of the first sub-terminal 111.

The guides 1122-1 to 1122-3 have shapes corresponding to those of the guide grooves 1111-1 to 1111-3 to allow the first sub-terminal 111 to be fastened to the second sub-terminal 112 in a sliding manner.

The first guide 1122-1 has a shape corresponding to that of the first guide groove 1111-1 to be fastened to the first guide groove 1111-1 of the first sub-terminal 111 in a sliding manner. Specifically, the first guide 1122-1 extends downwards vertically from one end of the body 1121 and an end of the first guide 1122-1 is bent into the first guide groove 1111-1. That is, the end of the first guide 1122-1 is fastened to the first guide groove 1111-1 in a sliding manner.

The second guide 1122-2 has a shape corresponding to that of the second guide groove 1111-2 to be fastened to the second guide groove 1111-2 of the first sub-terminal 111 in a sliding manner. Specifically, the second guide 1122-2 extends downwards vertically from the other end of the body 1121 and an end of the second guide 1122-2 is bent into the second guide groove 1111-2. That is, the end the second guide 1122-2 is fastened to the second guide groove 1111-2 in a sliding manner.

The third guide 1122-3 has a shape corresponding to that of the third guide groove 1111-3 to be fastened to the third guide groove 1111-3 of the first sub-terminal 111 in a sliding manner. Specifically, the third guide 1122-3 extends downwards vertically from a central portion of the body 1121 and an end of the third guide 1122-3 is fitted into the third guide groove 1111-3. The third guide 1122-3 extends downwards vertically from the central portion of the body 1121. The third guide 1122-3 has a laterally widened end. That is, the end of the third guide 1122-3 is wider than a midsection thereof.

In the embodiment of FIG. 4, the third guide 1122-3 includes a vertical member 1124 and a horizontal member 1125. The vertical member 1124 extends downwards vertically from the central portion of the body 1121 while the horizontal member 1125 is formed at an end of the vertical member 1124. In this regard, the horizontal member 1125 is wider than the vertical member 1124. Thus, a cross-section of the horizontal member 1125 and the vertical member 1124 together form an inverted "T" shape.

The protrusion 1123 is provided on the upper surface of the body 1121 and extends upwards vertically therefrom. That is, the protrusion 1123 is provided on the body 1121 and extends in a direction opposite to the third guide 1122-3. Threads are formed on the protrusion 1123. After the bus bar 200 is seated on the second sub-terminal 112, a fastening member 300 such as a nut is fastened to the protrusion 1123 having the threads, thus making it easy to connect the bus bar 200 to the battery cell 100.

For the convenience of description, in FIGS. 3A, 3B and 4, three guide grooves are formed in the first sub-terminal 111, but the described technology is not limited thereto. For example, two or more guide grooves may be formed in the upper surface of the first sub-terminal 111. In order to correspond to such a configuration, a guide which is similar in shape to the third guide 1122-3 may be further provided on the second sub-terminal 112.

FIG. 5 is a detailed sectional view illustrating the fastening area B of the first sub-terminal and the second sub-terminal shown in FIG. 4.

Referring to the embodiment of FIG. 5, in order to increase the fastening force between the first sub-terminal 111 and the second sub-terminal 112, a plurality of first locking projections 1112 are provided on at least one surface of the guide grooves 1111-1 to 1111-3.

In order to correspond to the first locking projections 1112, a plurality of second locking projections 1126 may be formed on at least one surface of the guides 1122-1 to 1122-3.

The first and second locking projections 1112 and 1126 enable the first sub-terminal 111 to be more firmly secured to the second sub-terminal 112 when the first sub-terminal 111 is fastened to the second sub-terminal 112. In some embodiments, the first and second locking projections 1112 and 1126 are configured to interlock.

As such, in the positive-pole terminal 110 according to the embodiment of FIG. 5, the first sub-terminal 111 is fastened to the second sub-terminal 112 in the sliding manner without any welding, thus increasing the fastening force therebetween and reducing both manufacturing cost and manufacturing time.

Particularly, in the positive-pole terminal 110 according to the FIG. 5 embodiment, the first guide groove 1111-1 and the first guide 1122-1, the second guide groove 1111-2 and the second guide 1122-2, and the third guide groove 1111-3 and the third guide 1122-3 are also fastened in the sliding manner, thus increasing the fastening force.

Further, in the positive-pole terminal 110 according to at least one embodiment, sliding fastening between the third guide groove 1111-3 and the third guide 1122-3 increases resistance to external force or shocks.

According to a comparative example wherein the third guide groove 1111-3 and the third guide 1122-3 are not formed on the positive-pole terminal 110, if a pulling force is applied in a direction from the body 1121 to the protrusion 1123, the body 1121 is likely to be bent due to the applied force. For example, it has been observed that the body is bent even when a vehicle equipped with a battery module according to the comparative example collides with an object at about 60 km/h.

In contrast, when the battery module 10 according to at least one embodiment is subjected to large force or shocks, the positive-pole terminal 110 including the body 1121 is not bent due to the third guide groove 1111-3 and the third guide 1122-3. Specifically, the durability of the battery module 10 according to at least one embodiment is about 10 times higher than that of the battery module according to the comparative example.

Since the positive-pole terminal 110 and the negative-pole terminal 120 are substantially similar to each other except that they have opposing polarities, a duplicated description will be omitted herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrode terminal formed on a battery cell, the electrode terminal comprising:
    a first sub-terminal including a plurality of guide grooves; and
    a second sub-terminal including a plurality of guides configured to respectively engage with the guide grooves in a sliding manner,
    wherein at least one of the guide grooves is formed in an upper surface of the first sub-terminal, and
    wherein the guide grooves comprise:
        a first guide groove formed in a first side surface of the first sub-terminal;
        a second guide groove formed in a second side surface of the first sub-terminal, wherein the second side surface opposes the first side surface; and
        a third guide groove formed in the upper surface of the first sub-terminal.

2. The electrode terminal of claim 1, wherein the second sub-terminal comprises:
    a plate-shaped body;
    a first guide extending vertically downwards from a first end of the body, wherein an end of the first guide is configured to be fastened to the first guide groove;
    a second guide extending vertically downwards from a second end of the body, wherein an end of the second guide is configured to be fastened to the second guide groove and wherein the second end of the body opposes the first end;
    a third guide extending vertically downwards from a central portion of the body, wherein the third guide is configured to be fastened to the third guide groove; and
    a protrusion extending vertically upwards from the body.

3. The electrode terminal of claim 2, wherein the third guide comprises:
    a vertical member extending vertically downwards from the central portion of the body; and
    a horizontal member formed on an end of the vertical member.

4. The electrode terminal of claim 3, wherein the horizontal member has a greater width than the vertical member.

5. The electrode terminal of claim 3, wherein the shape of the third guide groove corresponds to the shape of the third guide.

6. The electrode terminal of claim 2, wherein the protrusion is threaded.

7. The electrode terminal of claim 1, wherein the lengths of the guide grooves extend along the width of the battery cell.

8. The electrode terminal of claim 1, wherein each of the guide grooves comprises a plurality of first locking projections formed on at least one surface thereof.

9. The electrode terminal of claim 8, wherein each of the guides comprises a plurality of second locking projections formed on at least one surface thereof.

10. The electrode terminal of claim 9, wherein the first and second locking projections are configured to be interlocking.

11. A battery module comprising a plurality of battery cells connected to each other via a plurality of bus bars, wherein each of the battery cells comprises a pair of electrode terminals respectively connected to one of the bus bars and wherein each of the electrode terminals comprises:
   a first sub-terminal including a plurality of guide grooves; and
   a second sub-terminal including a plurality of guides configured to respectively engage with the guide grooves in a sliding manner,
   wherein at least one of the guide grooves is formed in an upper surface of the first sub-terminal, and
   wherein the guide grooves comprise:
      a first guide groove formed in a first side surface of the first sub-terminal;
      a second guide groove formed in a second side surface of the first sub-terminal, wherein the second side surface opposes the first side surface; and
      a third guide groove formed in the upper surface of the first sub-terminal.

12. The battery module of claim 11, wherein at least one of the guides of each of the electrode terminals is formed extending from a lower surface of the second sub-terminal and is configured to be inserted into the third guide groove.

13. The battery module of claim 11, wherein the guides of each of the electrode terminals comprise:
   first and second guides extending from opposing sides of the second sub-terminal and respectively configured to be fastened to the first and second guide grooves; and
   a third guide extending from the second sub-terminal and interposed between the first and second guides, wherein the third guide is configured to be fastened to the third guide groove.

14. The battery module of claim 13, wherein the cross-section of each of the third guides has an inverted "T" shape and wherein the cross-section of each of the third guide grooves has a shape corresponding to the shape of each of the third guides.

15. The battery module of claim 11, wherein each of the first sub-terminals includes first and second sides opposing each other, wherein the second sides of the first sub-terminals of the same battery cell face each other, and wherein each of the guide grooves extends from the first sides towards the second sides of the first sub-terminals.

16. The battery module of claim 11, wherein the second sub-terminals are configured to engageably slide onto the first sub-terminals from the first sides of the first sub-terminals.

17. The battery module of claim 11, wherein each of the guide grooves comprises a plurality of first locking projections formed on at least one surface thereof.

18. The battery module of claim 17, wherein each of the guides comprises a plurality of second locking projections formed on at least one surface thereof.

19. An electrode terminal formed on a battery cell, the electrode terminal comprising:
   a first sub-terminal including a plurality of guide grooves; and
   a second sub-terminal including a plurality of guides configured to respectively engage with the guide grooves in a sliding manner,
   wherein at least one of the guide grooves is formed in an upper surface of the first sub-terminal, and
   wherein at least one of the guide grooves is formed in a first side surface of the first sub-terminal.

20. A battery module comprising a plurality of battery cells connected to each other via a plurality of bus bars, wherein each of the battery cells comprises a pair of electrode terminals respectively connected to one of the bus bars and wherein each of the electrode terminals comprises:
   a first sub-terminal including a plurality of guide grooves; and
   a second sub-terminal including a plurality of guides configured to respectively engage with the guide grooves in a sliding manner,
   wherein at least one of the guide grooves is formed in an upper surface of the first sub-terminal, and
   wherein at least one of the guide grooves is formed in a first side of the first sub-terminal.

* * * * *